J. ROBERT.
Apparatus for Making Extracts.
No. 156,501. Patented Nov. 3, 1874.
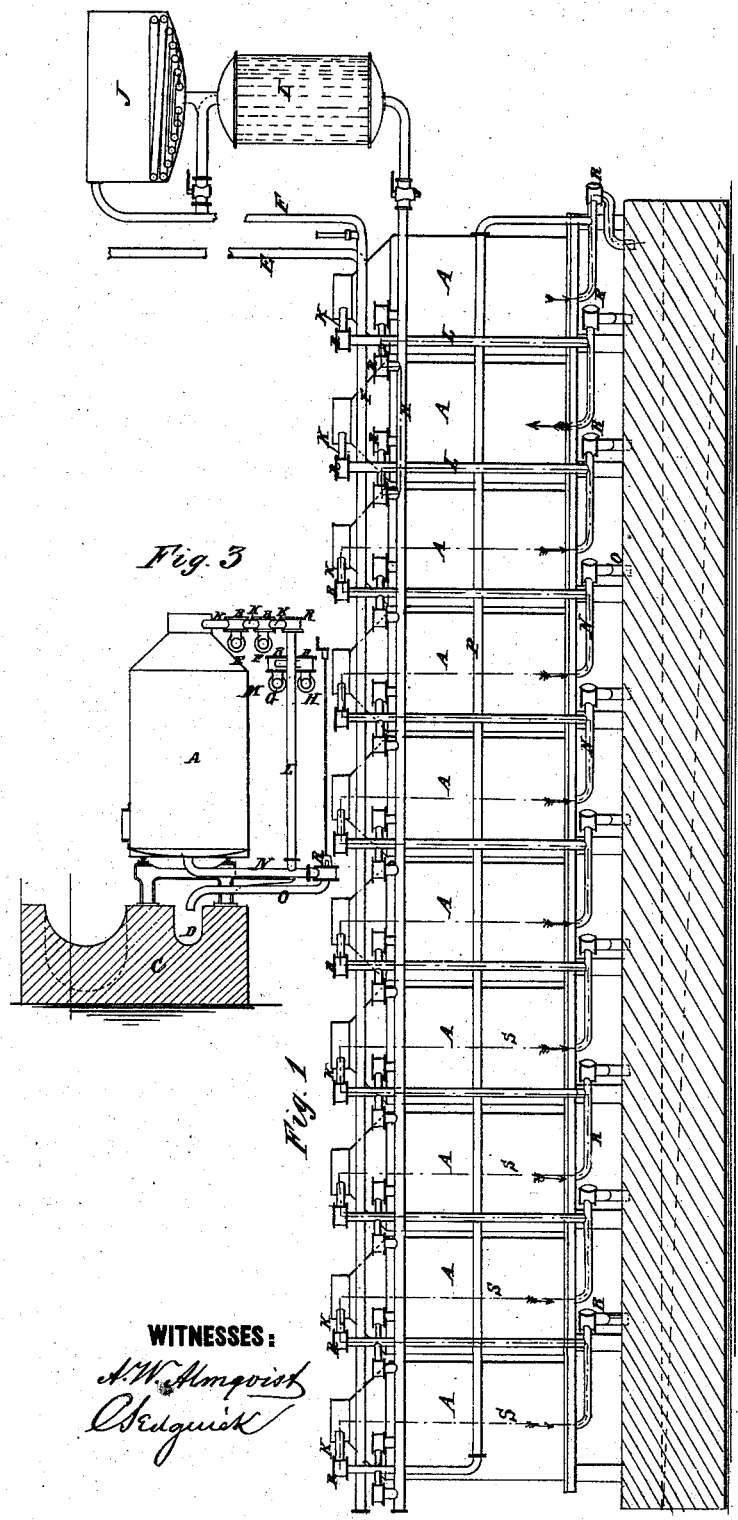
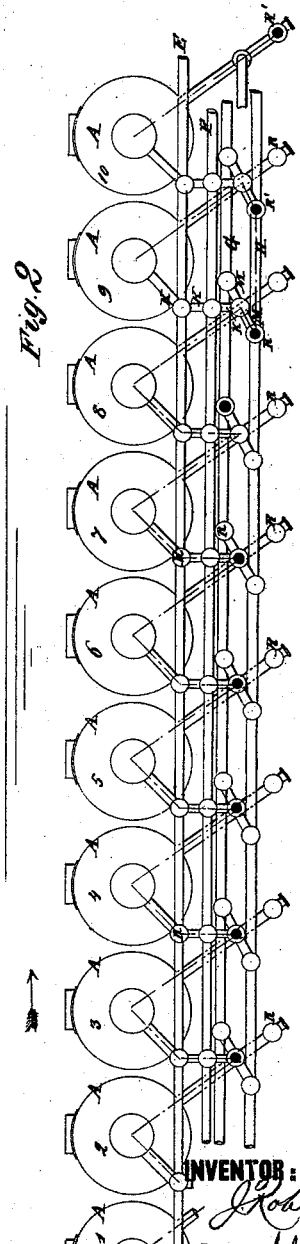

UNITED STATES PATENT OFFICE.

JULIUS ROBERT, OF GROSS SELOWITZ, AUSTRIA, ASSIGNOR TO OTTO KRATZ AND R. SIEG, OF NEW ORLEANS, LOUISIANA.

IMPROVEMENT IN APPARATUS FOR MAKING EXTRACTS.

Specification forming part of Letters Patent No. 156,501, dated November 3, 1874; application filed August 1, 1874.

*To all whom it may concern:*

Be it known that I, JULIUS ROBERT, of Gross Selowitz, Austria, have invented a new and Improved Apparatus for Making Extracts, of which the following is a specification:

My invention consists of an improved arrangement of extractors in a single battery, together with conducting and connecting pipes and heaters, for making extracts of juice from plants, by the process of "diffusing," as described in the patent granted to me October 30, 1866, No. 59,330, the said improvements being more simple and cheap than the two-battery plan represented in the aforesaid patent, and also more convenient to operate.

By my aforesaid process of diffusion the plants are first cut into thin slices or pieces of required size, and placed in extractors, together with water or juice of less strength than the juice in the cells of the plants, and allowed to stand for a short time, when the juice is replaced by other juices of less strength than the remaining juice in the cells of the plants, and so on, until all the juice is extracted, beginning with heated water or juice, to accelerate the process; but the subsequent diffusions may be made with cold juices. The thick juice thus extracted is drawn off to the factory, for the subsequent treatment; while the thin juices are passed through the heaters for being warmed, to be used for other diffusions, until made thick enough to be conducted away for the further treatment.

Figure 1 is a side elevation of a battery of two extractors, with pipes and heaters arranged according to my invention. Fig. 2 is a plan of the extractors and pipes; and Fig. 3 is a transverse section.

Similar letters of reference indicate corresponding parts.

A represents the extractors, which are arranged in a single row or battery above a platform, C, in which is a trough or conductor, D, for conducting the thick juice to the factory for subsequent treatment. E represents the water-pipe, for running water from an overhead reservoir into and through the extractors, for use in extracting the juices from the plants which are to be filled into the extractors, together with the liquid.

The extractors are closed tight after filling, to utilize the pressure of the reservoir and heaters, for forcing the liquid through them.

F is a pipe for running heated juice from the heater to the extractors; G, pipe for running the juice to the heater; H, pipe for conducting thick juice from the extractors; I and J, heaters arranged above the extractors; K, pipes connecting pipes E F together, and with the top of the extractors; also with vertical pipes L; M, connecting-pipes, for connecting pipes G H together, and with vertical pipes L. The pipes L connect the pipes E, F, G, and H with the pipes N, which connect with the bottom of the extractors; also with the discharge-pipe O; and the pipe P connects the top of the extractor of one end of the series with the pipe N entering the bottom of the extractor of the other end of the series, so as to run the juice from one to the other, when required. R and R' represent cocks for opening and closing the connections as required, the former representing closed cocks, and the latter open.

It will be seen that by this arrangement of pipes and connections the operation may be carried on continuously and in succession in all the different stages without interference of one with another.

In the drawing the open cocks and the dotted line S denote the water flowing from the reservoir, through pipe E, into and through Nos. 1, 2, 3, 4, 5, 6, 7, and 8, and into No. 9 at the bottom, while the thick juice from No. 10 is escaping from it into the duct D.

Any one or more of the extractors may be cut off for filling, and for the matters to remain at rest while the others are in connection for the progressive operations.

Having thus described my invention, I claim as new, and desire to secure by Letters Patent—

The combination of pipes E, F, G, H, and P, and the connections K L M N, escape-pipes O, and cocks R R', with a series of extractors, A, and heaters I J, substantially as specified.

The above specification of my invention signed by me this 15th day of April, 1874.

JULIUS ROBERT.

Witnesses:
ANTON MARKMÜLLER,
ANTON ESSINGER.